United States Patent
Lahti et al.

(10) Patent No.: US 6,581,582 B1
(45) Date of Patent: *Jun. 24, 2003

(54) PREHEAT FUEL DELIVERY SYSTEM

(76) Inventors: Mark S. Lahti, N14796 County Rd. 551, Wilson, MI (US) 49896; Donald L. Johnson, P.O. Box 234, Big Bay, MI (US) 49808

( * ) Notice: Subject to any disclaimer, the term of this patent is extended or adjusted under 35 U.S.C. 154(b) by 0 days.

This patent is subject to a terminal disclaimer.

(21) Appl. No.: 10/116,616

(22) Filed: Apr. 3, 2002

Related U.S. Application Data (63) Continuation-in-part of application No. 09/771,392, filed on Jan. 26, 2001, now Pat. No. 6,415,775.

(51) Int. Cl.⁷ .............................. F02M 31/00; F02G 5/02
(52) U.S. Cl. ....................... 123/557; 123/547; 123/543
(58) Field of Search ................................. 123/557, 543, 123/545, 546, 547, 142.5 R, 554, 555

(56) References Cited

U.S. PATENT DOCUMENTS

| | | | | |
|---|---|---|---|---|
| 3,530,843 A | * | 9/1970 | Fessenden | 123/547 |
| 3,631,923 A | * | 1/1972 | Izeki | 165/167 |
| 4,092,962 A | * | 6/1978 | Beaton et al. | 123/557 |
| 4,167,165 A | * | 9/1979 | Finlay et al. | 123/543 |
| 4,223,652 A | * | 9/1980 | Budnicki | 123/552 |
| 4,422,429 A | * | 12/1983 | Reed | 123/538 |
| 4,476,840 A | * | 10/1984 | Budnicki et al. | 123/523 |
| 4,515,135 A | * | 5/1985 | Glass | 123/25 B |
| 4,567,857 A | * | 2/1986 | Houseman et al. | 123/1 A |
| 4,611,567 A | * | 9/1986 | Covey, Jr. | 123/545 |
| 4,612,896 A | * | 9/1986 | Leibrand, Sr. | 123/557 |
| 4,703,741 A | * | 11/1987 | Curran et al. | 123/557 |
| 4,718,393 A | * | 1/1988 | Bakish | 123/545 |
| 4,733,636 A | * | 3/1988 | Harris et al. | 122/39 |
| 4,862,836 A | * | 9/1989 | Chen et al. | 123/3 |
| 5,040,518 A | * | 8/1991 | Hamm | 123/545 |
| 5,174,266 A | * | 12/1992 | Evdokimo | 123/552 |
| 5,443,053 A | * | 8/1995 | Johnson | 123/557 |
| 5,794,601 A | * | 8/1998 | Pantone | 123/538 |
| 5,931,219 A | | 8/1999 | Kull et al. | 165/51 |
| 6,186,126 B1 | * | 2/2001 | Gray, Jr. | 123/557 |
| 6,415,775 B1 | * | 7/2002 | Lahti et al. | 123/543 |

FOREIGN PATENT DOCUMENTS

JP 158786 * 6/1997 .......... F02M/21/06

* cited by examiner

Primary Examiner—Henry C. Yuen
Assistant Examiner—Hai Huynh
(74) Attorney, Agent, or Firm—Donald J. Ersler (57) ABSTRACT

A preheat fuel delivery system includes a fuel processor and a source of vaporized fuel. Vaporized fuel is feed into the inlet fuel port of the fuel processor. An outlet fuel port of the fuel processor is connected to an intake port of a combustion source. An exhaust port of the combustion source is attached to an exhaust intake port of the fuel processor. The heat from the exhaust gases of the combustion source heat the vaporized fuel inside the fuel processor. A first embodiment of the fuel processor contains a plurality of plates. A second embodiment of the fuel processor utilizes a plurality concentric tubes. A third embodiment of the fuel processor includes two concentric tubes.

24 Claims, 7 Drawing Sheets

PREHEAT FUEL DELIVERY SYSTEM

CROSS-REFERENCE TO RELATED APPLICATIONS

This is a continuation-in-part application of Ser. No. 09/771,392 now U.S. Pat. No. 6,415,775 filed on Jan. 26, 2001.

BACKGROUND OF THE INVENTION

1. Field of the Invention

The present invention relates generally to fuel delivery systems and more specifically to a preheat fuel delivery system which greatly increases fuel efficiency of a combustion source.

2. Discussion of the Prior Art

There are numerous patents directed at increasing the fuel efficiency of some type of combustion source. Some of these patents include U.S. Pat. No. 4,735,186 to Parsons, U.S. Pat. No. 5,074,273 to Brown, U.S. Pat. No. 5,379,728 to Cooke, U.S. Pat. No. 5,408,973 to Spangjer, and U.S. Pat. No. 5,794,601 to Patone.

Accordingly, there is a clearly felt need in the art for a preheat fuel delivery system which has an uncomplicated design, may be easily configured for different types of combustion sources, greatly increases fuel efficiency, and may be used with any type of combustion source without having to make modifications to the combustion source.

SUMMARY OF THE INVENTION

The present invention provides a preheat fuel delivery system with an uncomplicated design that greatly increases fuel efficiency. The preheat fuel delivery system includes a fuel processor and a source of vaporized fuel. The source of vaporized fuel could be a bubbler fuel tank, a fuel injector, a carburetor, or any other suitable source of vaporized fuel. The bubbler fuel tank includes a fuel container, container cover, inlet supply line, and vapor outlet line. The inlet supply and vapor outlet lines are inserted through the container cover. The inlet supply line continues to substantially a bottom of the fuel container. The vapor outlet line may be flush with a bottom of the container cover. The container cover is sealed to a top of the fuel container. The vapor outlet line is attached to an inlet fuel port of the fuel processor. An outlet fuel port of the fuel processor is connected to an intake manifold through a fuel outlet line. The intake manifold is attached to an intake port of a combustion source. The intake manifold includes a fuel inlet port and an air inlet port. An air cleaner is preferably attached to the air inlet port.

One end of an exhaust intake line is connected to the exhaust port of a combustion source and the other end of the exhaust intake line is attached to an inlet exhaust port of the fuel processor. One end of an exhaust outlet line is attached to an outlet exhaust port of the fuel processor and the other end is preferably attached to a muffler. The heat from the exhaust of the combustion source heats the vaporized fuel from the bubbler fuel tank. The vaporized fuel is pulled into the intake port of the combustion source by vacuum. The preheated fuel enables a more efficient burning of the fuel. Exhaust gases from the outlet exhaust port may be fed into the inlet supply line of the bubbler tank to further increase fuel efficiency.

A first embodiment of a fuel processor includes a pair of inlet/outlet plates, at least one heater plate, at least one exhaust transfer plate, and at least one fuel transfer plate. Each inlet/outlet plate includes a fuel nipple and exhaust nipple for attachment of fuel and exhaust lines. A single inlet/outlet plate terminates each end of the fuel processor. Exhaust gases from the combustion source flows through an exhaust transfer plate and heats the at least one heater plate. Fuel flowing through the fuel transfer plate absorbs heat from the at least one heater plate. An obstructed path may be created for exhaust flowing through the exhaust transfer plate and/or fuel flowing through the fuel transfer plate to enable greater heat absorption by the vaporized fuel.

A second embodiment of a fuel processor includes a center tube, a middle tube, and an outside tube. Preferably, exhaust gases from the combustion source enter the center tube and exit through the space between the middle and outer tubes. The vaporized fuel enters and exits through the space between the center and middle tubes. The heat from the exhaust gases preheat the vaporized fuel.

A third embodiment of a fuel processor includes an inner tube an outer tube, and an insulation layer. Preferably, exhaust gases from the combustion source enter the inner tube on one end and exit through the other end thereof. The vaporized fuel enters the space between the outer tube and the inner tube on one end and exit through the other end thereof. The insulation layer is wrapped around the outside diameter of the outer tube. The heat from the exhaust gases preheat the vaporized fuel. The insulation layer prevents heat from escaping from the outer tube. An obstructed path may be created for exhaust and/or fuel flowing through the tubes of the second or third embodiment to enable greater heat absorption by the vaporized fuel.

A catalyst may be used to further volatilize the vaporized fuel. The vaporized fuel may be propelled into the intake port of the combustion source with a pump, or any other suitable fuel pressurizing device. An air pressuring device may also be attached to the combustion source such as a turbo or supercharger to enhance performance thereof.

Accordingly, it is an object of the present invention to provide a preheat fuel delivery system which has an uncomplicated design.

It is a further object of the present invention to provide a preheat fuel delivery system which is easily configured for different types of combustion sources.

It is yet a further object of the present invention to provide a preheat fuel delivery system which greatly increases fuel efficiency.

Finally, it is another object of the present invention to provide a preheat fuel delivery system which may be used with any type of combustion source without having to make modifications to the combustion source.

These and additional objects, advantages, features and benefits of the present invention will become apparent from the following specification.

DETAILED DESCRIPTION OF THE PREFERRED EMBODIMENTS

Figure 1:
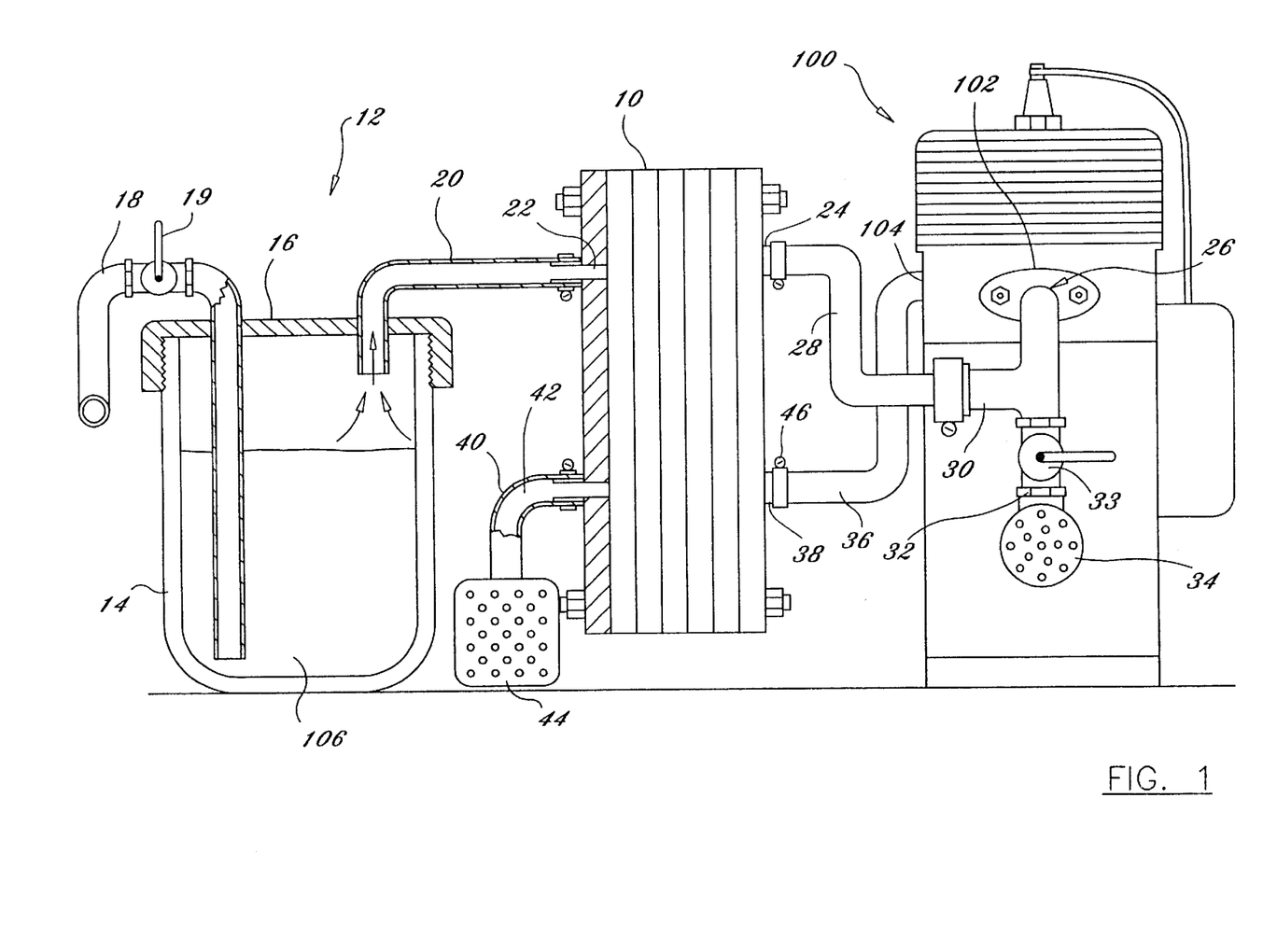
FIG. 1 is a side view of a preheat fuel delivery system in accordance with the present invention.

With reference now to the drawings, and particularly to FIG. 1, there is shown a side view of a preheat fuel delivery system 1. The preheat fuel delivery system 1 includes a fuel processor 10 and a source of vaporized fuel. The source of vaporized fuel could be a bubbler fuel tank 12, a fuel injector, a carburetor, or any other suitable source of vaporized fuel. The bubbler fuel tank 12 includes a fuel container 14, container cover 16, inlet supply line 18, and vapor outlet line 20. The inlet supply and vapor outlet lines are inserted through the container cover 16. The inlet supply line 18 continues to substantially a bottom of the fuel container 16. Preferably, the inlet supply line 18 has a valve 19 to control the amount of air entering the bubbler fuel tank 12. The vapor outlet line 20 may be flush with a bottom of the container cover 16. The container cover 16 is sealed to a top of the container 14. The vapor outlet line 20 is attached to the inlet fuel port 22 of the fuel processor 10. An outlet fuel port 24 of the fuel processor 10 is connected to an intake manifold 26 through a fuel outlet line 28.

FIG. 1 does not show the true position of the outlet fuel port 24 to better illustrate the fuel outlet line 28. The intake manifold 26 is attached to an intake port 102 of a combustion source 100. The intake manifold 26 includes a fuel inlet port 30 and an air inlet port 32. An air cleaner 34 is preferably attached to the air inlet port 32. Preferably, the air inlet port 32 has a valve 33 to control the amount of air entering the intake port 102. Lines are preferably attached to the fuel processor 10 with hose clamps 46, but other attachment devices may also be used.

One end of an exhaust intake line 36 is connected to the exhaust port 104 of the combustion source 100 and the other end of the exhaust intake line 36 is attached to an inlet exhaust port 38 of the fuel processor 10. One end of an exhaust outlet line 40 is attached to an outlet exhaust port 42 of the fuel processor 10 and the other end is attached to a muffler 44. Fuel 106 vaporizes in the bubbler fuel tank 14 and enters the fuel processor 10 through the vapor outlet line 20. The fuel 106 is replaced by a gas (such as air or possibly exhaust fumes) entering the inlet supply line 18. The vaporized fuel is pulled through the fuel processor 10 into the intake port 102 by vacuum from the combustion source 100.

Figure 2:
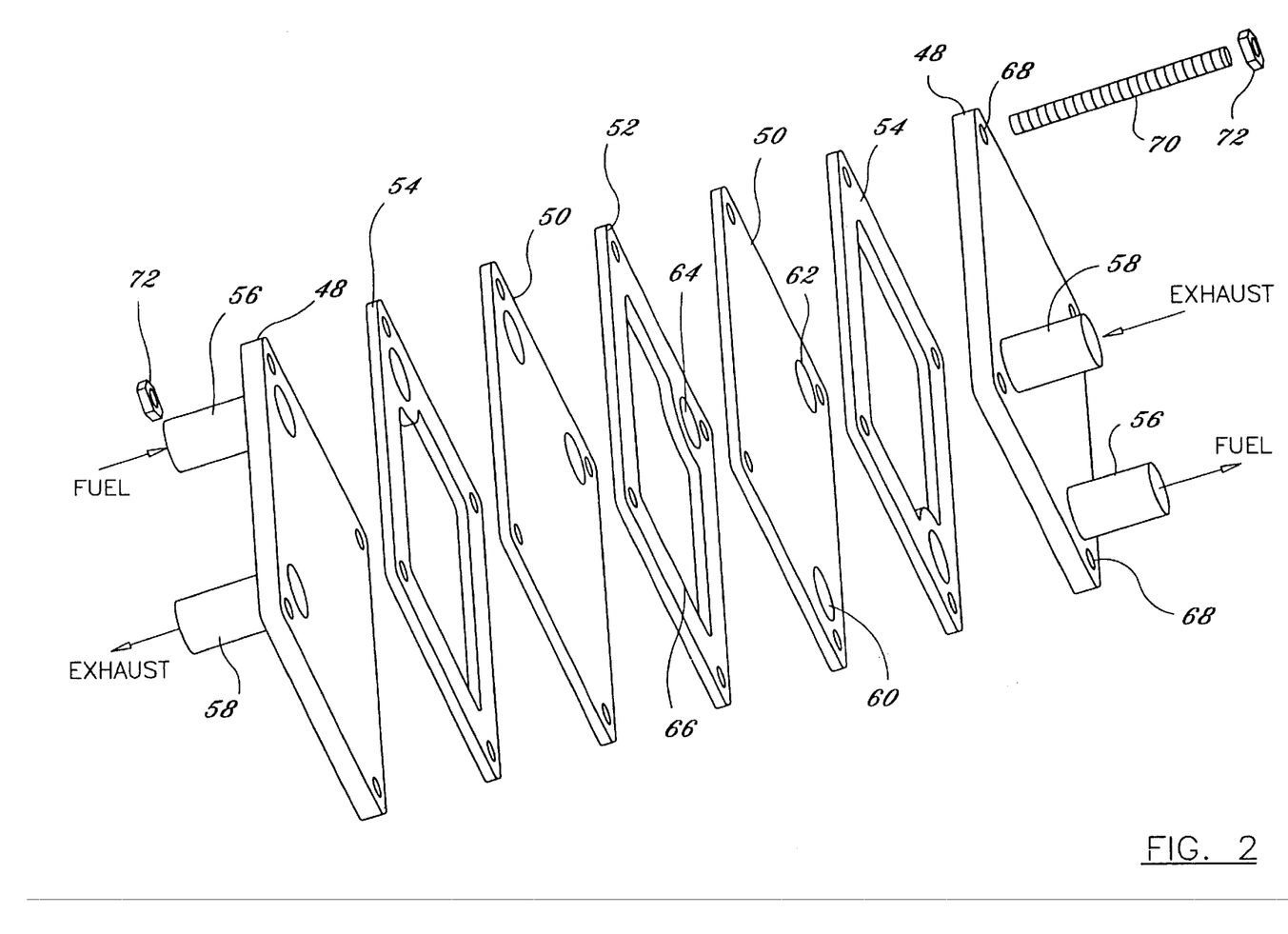
FIG. 2 is an exploded perspective view of a fuel processor of a preheat fuel delivery system in accordance with the present invention.

With reference to FIG. 2, the fuel processor 10 includes a pair of inlet/outlet plates 48, at least one heater plate 50, at least one fuel transfer plate 52, and at least one exhaust transfer plate 54. Each inlet/outlet plate 48 preferably includes an exhaust nipple 56 and a fuel nipple 58 for attachment of fuel and exhaust lines. Other methods of attaching lines may also be used. A single inlet/outlet plate 48 terminates each end of the fuel processor 10. It is preferable to have two exhaust transfer plates 54 and two heater plates 50 for a single fuel transfer plate 52 as shown in FIG. 2. Each heater plate 50 includes a fuel passage 60 and an exhaust passage 62. Each transfer plate includes a passage opening 64 and a transfer area 66. FIG. 2 shows the vaporized fuel flowing in the direction opposite of the exhaust gas, however, the vaporized fuel may flow in the same direction as the exhaust gas.

The plates 48, 50, 52 are shown as having a substantially square shape on the outside perimeter thereof and the at least one transfer plate 52 is shown as having a substantially square shape on the inside perimeter thereof. However, the plates 48, 50, 52 should not be limited to the substantially square shape, but could be rectangular, round, oval or any other suitable shape. The plates 48, 50 and 52 may be fabricated from stainless steel to prevent corrosion thereof.

The jog in the flow path of the exhaust gas through the fuel processor 10 forces the exhaust gas to flow through the transfer area 66 and heat the surface of each heater plate 50. The jog in the flow path of the vaporized fuel forces thereof to flow across each heater plate 50 and absorb the heat energy therein. The plurality of plates are preferably retained against each other by forming holes 68 in the corners thereof, inserting a threaded stud 70, and tightening a nut 72 on each end of the threaded stud 70, other assembly methods may also be used.

Figure 2A:
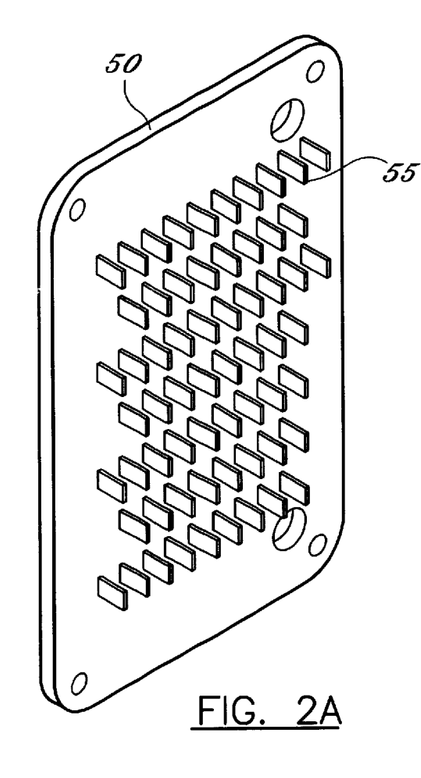
FIG. 2a is a perspective view of a heat transfer plate with a plurality of fins of a fuel processor of a preheat fuel delivery system in accordance with the present invention.

An obstructed path may be created for exhaust flowing through the exhaust transfer plate and/or fuel flowing through the fuel transfer plate to enable greater heat absorption by the vaporized fuel. The obstructed path for exhaust or fuel flow may be implemented by forming a plurality of projections on one or both sides of the heat transfer plate 50. With reference to FIG. 2a, the plurality of projections take the form of a plurality of fins 55. The orientation of the plurality of fins 55 is such that the vaporized fuel or exhaust would have to take an indirect route to pass across the fuel transfer plate 52 or the exhaust transfer plate 54, respectively.

Figure 2B:
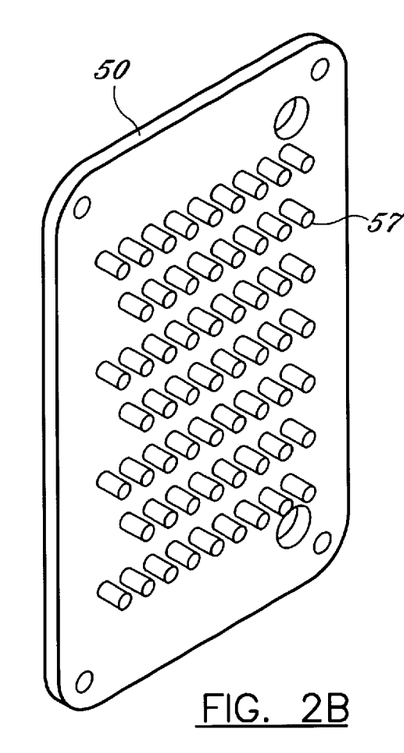
FIG. 2b is a perspective view of a heat transfer plate with a plurality of pins of a fuel processor of a preheat fuel delivery system in accordance with the present invention.
Figure 2C:
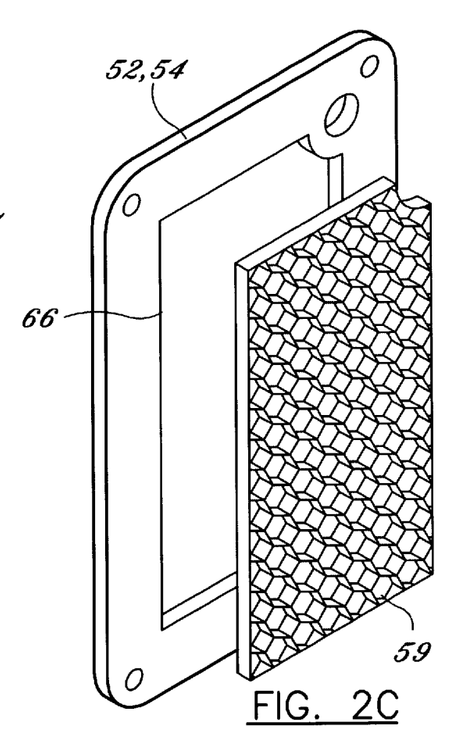
FIG. 2c is a perspective view of a honeycomb material of of a fuel processor of a preheat fuel delivery system in accordance with the present invention.

With reference to FIG. 2b, the plurality of projections take the form of a plurality of pins 57. The orientation of the plurality of pins 57 is such that the vaporized fuel or exhaust would have to take an indirect route to pass across the fuel transfer plate 52 or the exhaust transfer plate 54, respectively. With reference to FIG. 2c, a honeycomb material 59 may be inserted into a transfer area 66 of the fuel or exhaust transfer plates. The honeycomb material 59 would create an obstructed path for the flow of fuel or exhaust across the transfer area 66. The The honeycomb material 59 is preferably fabricated from a metallic material.

However, the plurality of projections may be arranged in a nonobstructing orientation to increase heat absorption by the heat transfer plate 50 while minimizing back pressure for fuel or exhaust flow. Fins, pins, and honeycomb have been disclosed as a projection, but any other geometric shapes may also be used. The transfer area 66 of the fuel transfer plate 52 the heater plate 50 (with or without the plurality of projections) may be plated with a catalyst to improve volatilization of the vaporized fuel. The catalyst may be platinum, crystalline zeolite, or any other suitable catalyst.

Figure 3:
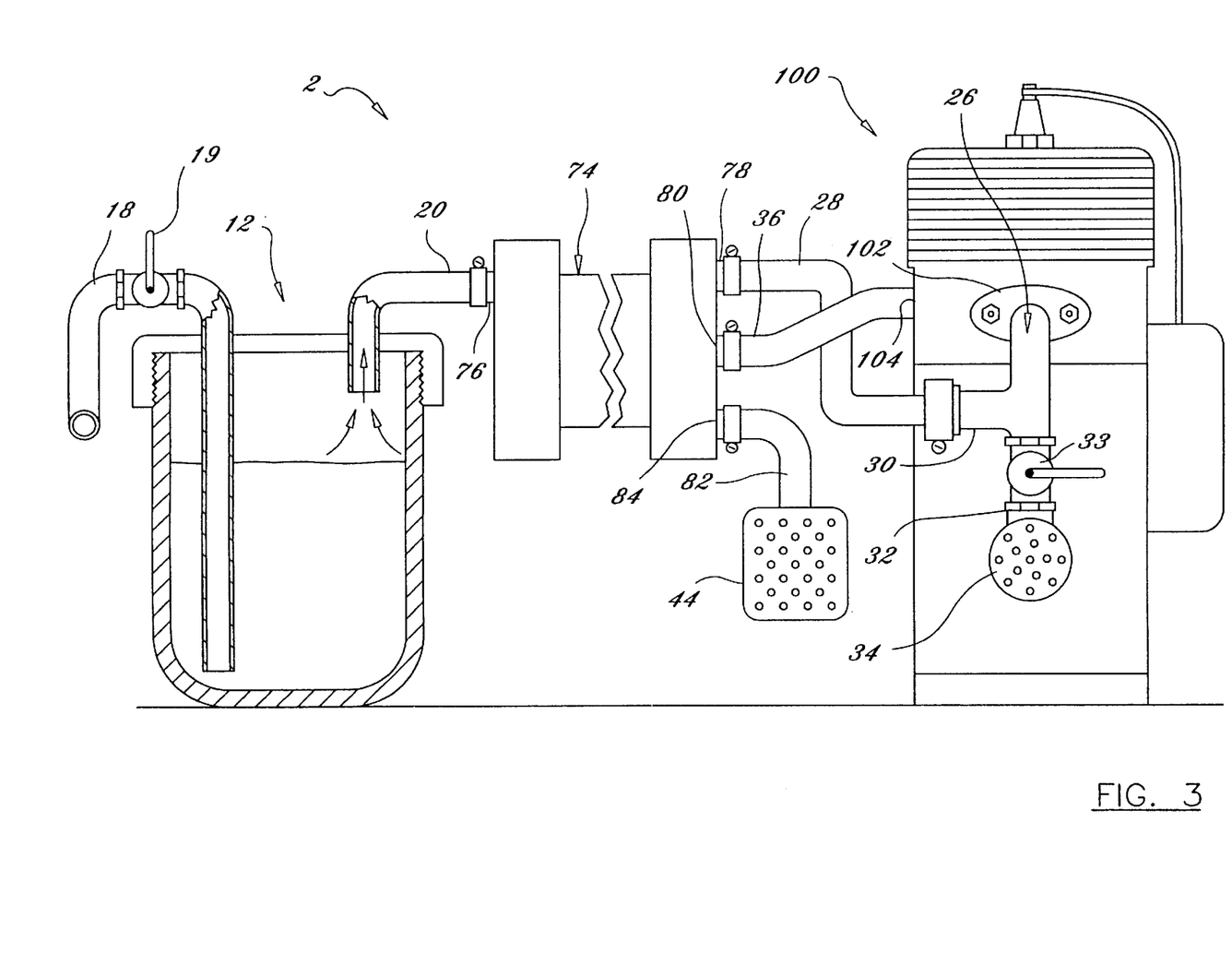
FIG. 3 is a side view of a preheat fuel delivery system with a second embodiment of the fuel processor in accordance with the present invention.

With reference to FIG. 3, a second embodiment of a preheat fuel delivery system 2 includes a fuel processor 74 and a source of vaporized fuel. The source of vaporized fuel could be a bubbler fuel tank 12, a fuel injector, a carburetor, or any other suitable source of vaporized fuel. The vapor outlet line 20 extends from the bubbler fuel tank 12 and is attached to the inlet fuel port 76 of the fuel processor 74. An outlet fuel port 78 of the fuel processor 74 is connected to an intake manifold 26 through a fuel outlet line 28. The intake manifold 26 is attached to the intake port 102 of the combustion source 100. The intake manifold 26 includes the fuel inlet port 30 and the air inlet port 32. Lines are preferably attached to the fuel processor 74 with hose clamps 46, but other attachment devices may also be used.

One end of an exhaust intake line 36 is connected to the exhaust port 104 of the combustion source 100 and the other end of the exhaust intake line 36 is attached to an inlet exhaust port 80 of the fuel processor 74. One end of an exhaust outlet line 82 is attached to an outlet exhaust port 84 of the fuel processor 74 and the other end is attached to a muffler 44.

Figure 4:
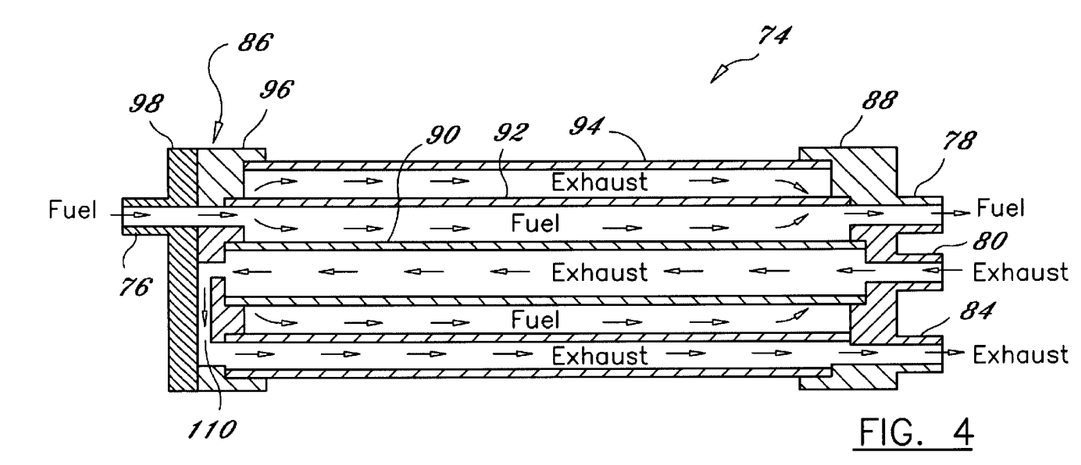
FIG. 4 is a cross sectional view of a second embodiment of a fuel processor of a preheat fuel delivery system in accordance with the present invention.

With reference to FIG. 4, the fuel processor 74 includes a first end cap 86, a second end cap 88, a center tube 90, a middle tube 92, and an outside tube 94. The tubes are preferably retained concentric to each other. The exhaust gases are preferably routed through the center tube 90, then through the space between the middle and outside tubes. The vaporized fuel is routed through the space between the center and middle tubes.

The tubes are terminated on one end by the first end cap 86 and on the other end by the second end cap 88. The first end cap preferably includes a cover cap 98 and a path cap 96. The path cap 96 retains the tubes and the cover cap 98 is attached to the path cap 96 to seal at least one exposed exhaust passage 110. Vaporized fuel enters the space between the center and middle tubes through the inlet fuel port 76. The vaporized fuel exits through an outlet fuel port 78 formed in the second end cap 88. The exhaust gases enter the center tube 90 through the inlet exhaust port 80 formed in the second end cap 88. The exhaust gases flow through the center tube 90, the at least one exhaust passage 110, and the space between the outer and middle tubes. The exhaust gases in the center tube 90 and the space between the outer and middle tubes heat the vaporized fuel between the center and middle tubes. The exhaust gases exit through the outlet exhaust port 84.

Figure 5:
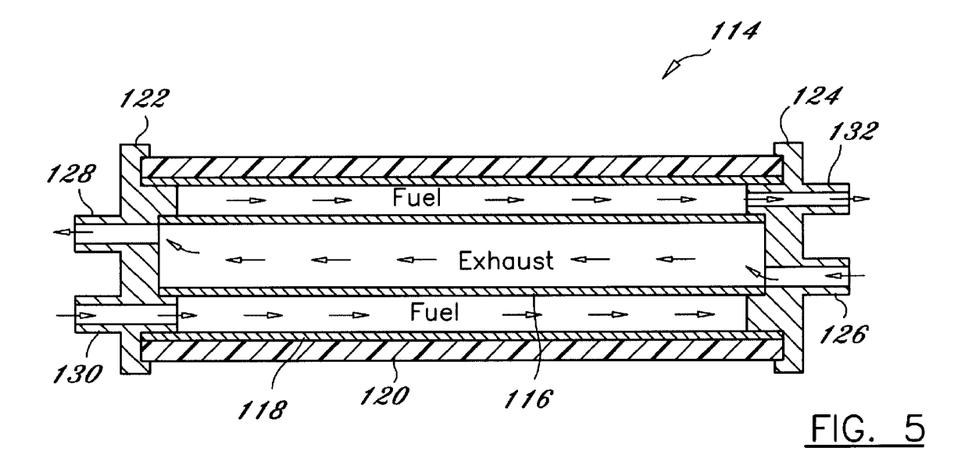
FIG. 5 is a cross sectional view of a third embodiment of a fuel processor of a preheat fuel delivery system in accordance with the present invention.

With reference to FIG. 5, a third embodiment of a fuel processor 114 includes an inner tube 116, an outer tube 118, an insulation layer 120, a first end cap 122, and a second end cap 124. The inner tube 116 and outer tube 118 are retained by the first and second end caps. The insulation layer 120 is formed around outer tube 118. An outlet exhaust port 128 and an inlet fuel port 130 are formed in the first end cap 122. An inlet exhaust port 126 and an outlet fuel port 132 are formed in the second end cap 124.

Preferably, exhaust gases from the exhaust port 104 of the combustion source 100 enter the inner tube 116 through the inlet exhaust port 126 and exits the inner tube 116 through the outlet exhaust port 128. The outlet exhaust port 128 may be terminated with a muffler 44. Preferably, vaporized fuel enters the space between outer tube 118 and the inner tube 116 through the inlet fuel port 130 and exits the outer tube 118 through the outlet fuel port 132. The outlet fuel port 132 is connected to the intake manifold 26 of the combustion source 100. The vaporized fuel is supplied by any suitable source of vaporized fuel such as a bubbler fuel tank 12, a fuel injector, or a carburetor.

The vaporized fuel flowing through the space between the outer tube 118 and inner tube 116 absorbs heat from the exhaust gases flowing through the inner tube 116. The insulation layer 120 prevents the superheated vaporized fuel from being cooled by outside ambient air. FIG. 5 shows vaporized fuel traveling in one direction and the exhaust gases in the opposite direction. However, the directions may be reversed or the exhaust gasses and vaporized fuel may travel in the same direction.

An obstructed path may be created for exhaust and/or fuel flowing through the tubes of the second or third embodiment to enable greater heat absorption by the vaporized fuel similar to that illustrated in FIGS. 2a–2c. The obstructed path may be implemented by forming a plurality of projections on the inner or outer diameters of the each tube. A honeycomb material may be inserted into the inner diameter of one of the tubes. However, the plurality of projections may be arranged in a nonobstructing orientation to increase heat absorption by the tubes while minimizing back pressure for fuel or exhaust flow. Fins, pins, and honeycomb have been disclosed as a projection, but any other geometric shapes may also be used.

The tubes which have contact with the vaporized fuel (with or without the plurality of projections) may be plated with a catalyst to improve volatilization of the vaporized fuel. The catalyst may be platinum, crystalline zeolite, or any other suitable catalyst.

Figure 6:
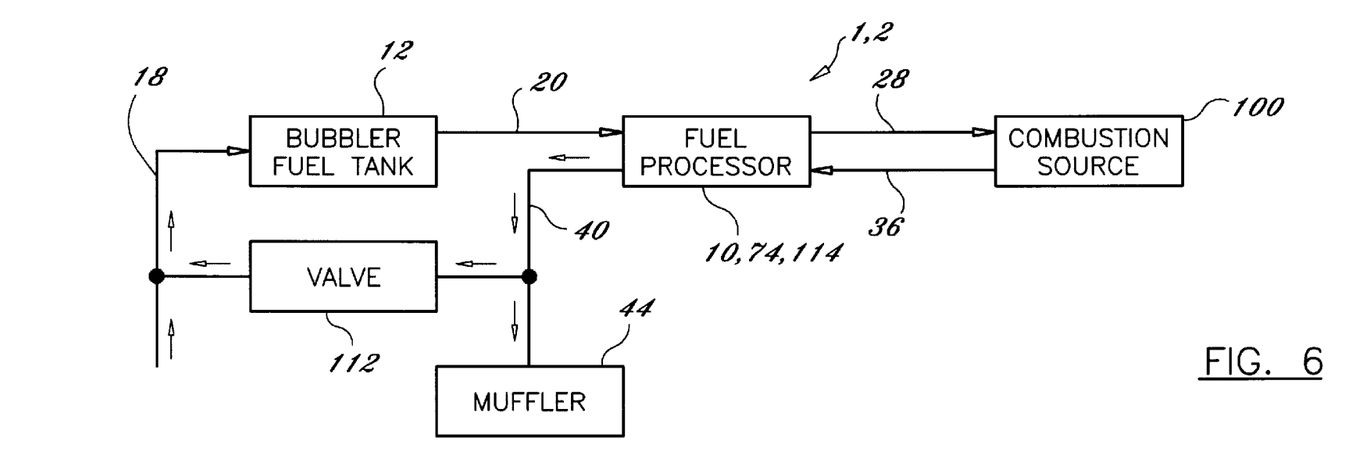
FIG. 6 is a schematic diagram of exhaust gases being partially fed back into the bubbler air supply line in accordance with the present invention.

With reference to FIG. 6, the exhaust may be partially fed back into the preheat fuel delivery system 1 or 2 by connecting the exhaust outlet line 40 to the inlet supply line 18 through a limiting valve 112. The limiting valve controls the amount of exhaust gases entering the inlet supply line 18. The exhaust gases further increase fuel efficiency. The bubbler tank 12 in either embodiment may be replaced by fuel injection.

Figure 7:
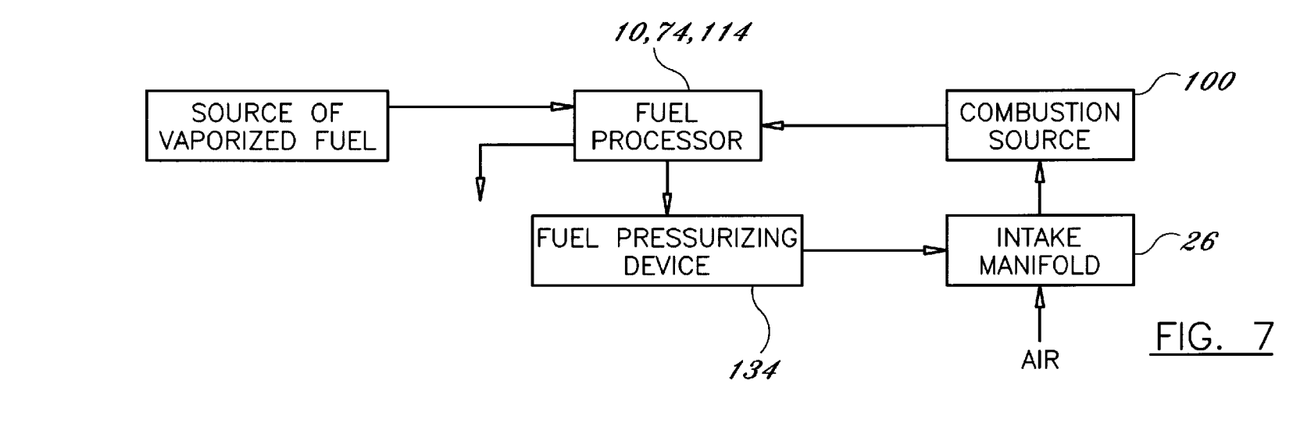
FIG. 7 is a schematic diagram of a fuel pressurizing device utilized to propel vaporized fuel into a combustion source in accordance with the present invention.

With reference to FIG. 7, the vaporized fuel may be propelled into the intake port of the combustion source 100 with a pump, or any other suitable fuel pressurizing device 134. The fuel pressurizing device 134 may be needed to compensate for drag induced by a plurality of projections. The vaporized fuel is drawn from the source of vaporized fuel through the fuel processor 10, 74 or 114 by the fuel pressurizing device 134 and propelled into the combustion source 100 through the intake manifold 26.

Figure 8:
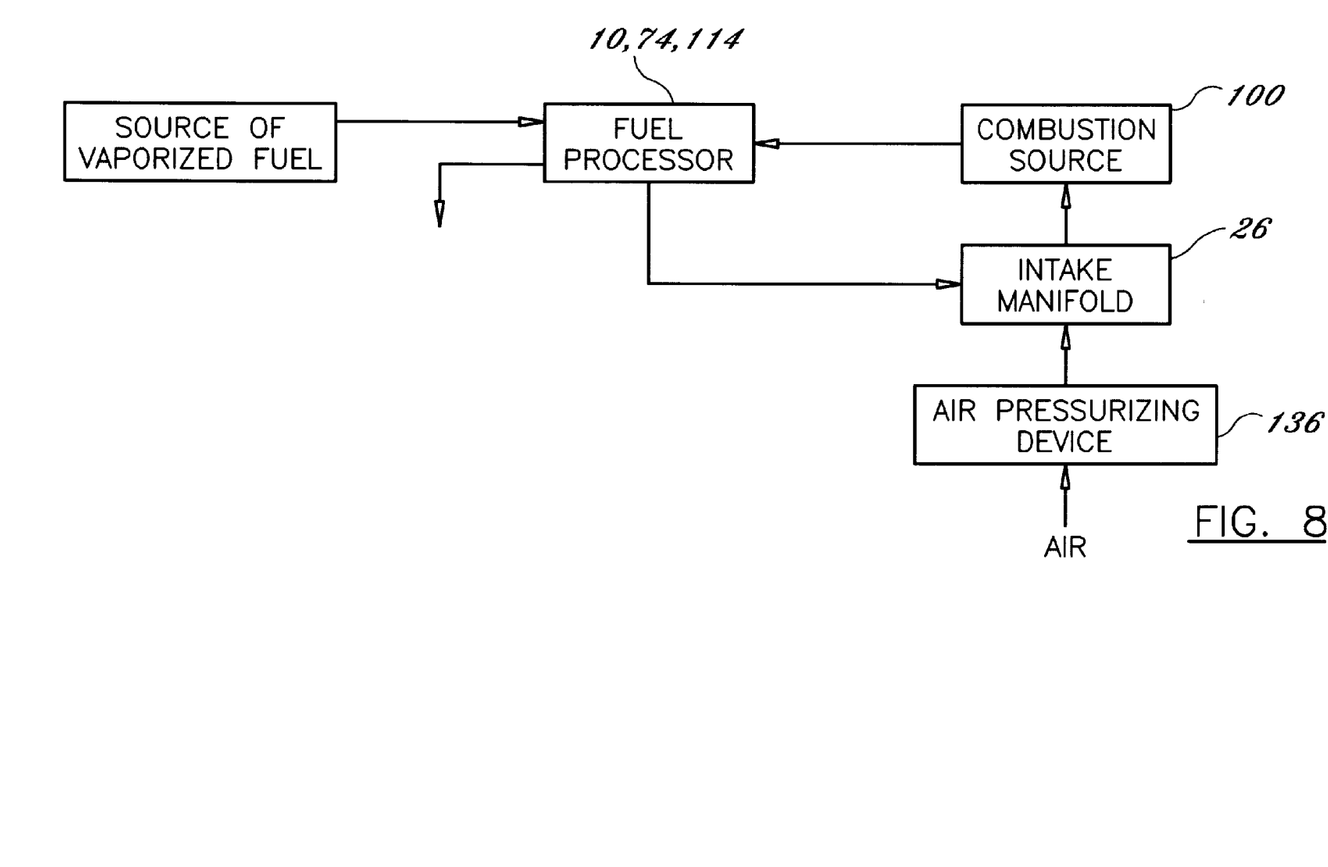
FIG. 8 is a schematic diagram of an air pressurizing device utilized to propel air into a combustion source in accordance with the present invention.

With reference to FIG. 8, an air pressurizing device 136 is attached to the combustion source 100 such as a turbo or supercharger to enhance performance thereof. The air pressurizing device 136 forces air into the combustion source 100 through the intake manifold 26. The fuel processor 10, 74 or 114 provides vaporized fuel to the intake manifold 26 from the source of vaporized fuel.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A method of superheating vaporized fuel comprising the steps of:
   (a) providing at least one heater plate with two sides;
   (b) providing at least one exhaust transfer plate, one of said at least one exhaust transfer plate being adjacent one side of said at least one heater plate;
   (c) providing at least one fuel transfer plate, one of said at least one fuel transfer plate being adjacent the other side of said at least one heater plate;

(d) flowing exhaust gas across one side of said at least one heater plate; and (e) flowing vaporized fuel across the other side of said at least one heater plate.

2. The method of superheating vaporized fuel of claim 1, further comprising the step of:

(f) providing two inlet/outlet plates which are capable of inputing and outputing vaporized fuel and exhaust gas.

3. The method of superheating vaporized fuel of claim 1, further comprising the step of:

(f) applying a catalyst to all surfaces which have contact with said vaporized fuel.

4. The method of superheating vaporized fuel of claim 1, further comprising the step of:

(f) forming a plurality of projections on at least one side of said at least one heater plate.

5. The method of superheating vaporized fuel of claim 1, further comprising the step of:

(f) drawing vaporized fuel across said at least one heater plate with a fuel pressurizing device.

6. The method of superheating vaporized fuel of claim 2, further comprising the steps of:

(f) forming a single hole through each corner of each said plate;

(g) inserting a single threaded stud through each said hole in each said plate; and (h) tightening a nut on each end of each said threaded stud.

7. The method of superheating vaporized fuel of claim 1, further comprising the step of:

(f) forming at least one exhaust passage and at least one fuel passage through said at least one heater plate.

8. The method of superheating vaporized fuel of claim 1, further comprising the step of:

(f) forming at least one passage opening and a transfer area through each said transfer plate.

9. A method of superheating vaporized fuel comprising the steps of:

(a) providing at least one heater plate with two sides;

(b) providing at least one exhaust transfer plate, one of said at least one exhaust transfer plate being adjacent one side of said at least one heater plate;

(c) providing at least one fuel transfer plate, one of said at least one fuel transfer plate being adjacent the other side of said at least one heater plate;

(d) terminating each end of said at least one fuel transfer plate, said at least one exhaust transfer plate, and said at least one heater plate with two inlet/outlet plates;

(e) flowing exhaust gas across one side of said at least one heater plate; and (f) flowing vaporized fuel across the other side of said at least one heater plate.

10. The method of superheating vaporized fuel of claim 9, further comprising the steps of:

(g) applying a catalyst to all surfaces which have contact with said vaporized fuel.

11. The method of superheating vaporized fuel of claim 9, further comprising the steps of:

(g) forming a plurality of projections on at least one side of said at least one heater plate.

12. The method of superheating vaporized fuel of claim 9, further comprising the steps of:

(g) drawing vaporized fuel across said at least one heater plate with a fuel pressurizing device.

13. The method of superheating vaporized fuel of claim 9, further comprising the step of:

(f) forming a single hole through each corner of each said plate;

(g) inserting a single threaded stud through each said hole in each said plate; and (h) tightening a nut on each end of each said threaded stud.

14. The method of superheating vaporized fuel of claim 9, further comprising the step of:

(f) forming at least one exhaust passage and at least one fuel passage through said at least one heater plate.

15. The method of superheating vaporized fuel of claim 9, further comprising the step of:

(f) forming at least one passage opening and a transfer area through each said transfer plate.

16. The method of superheating vaporized fuel in combination with a combustion source of claim 9 wherein:

(g) providing a source of vaporized fuel;

(h) inputing superheated vaporized fuel into said combustion source; and (i) inputing exhaust gas from said combustion source to change vaporized fuel from said source of vaporized fuel into superheated vaporized fuel.

17. The method of superheating vaporized fuel in combination with a combustion source of claim 16 wherein:

(j) providing an air pressurizing device to force air into an intake port of said combustion source.

18. A preheat fuel delivery system in combination with a combustion source comprising:

a source of vaporized fuel; and a fuel processor including a first inlet/outlet plate, a second inlet/outlet plate, at least one heater plate, at least one exhaust transfer plate, and at least one fuel transfer plate, said first inlet/outlet plate receiving vaporized fuel from said vapor outlet, said second inlet/outlet plate being connected to an intake port and an exhaust port of the combustion source, exhaust gases from the exhaust port passing through said at least one exhaust transfer plate and heating said at least one heater plate, the vaporized fuel passing through said at least one fuel transfer plate and absorbing heat from said at least one heater plate.

19. The preheat fuel delivery system in combination with a combustion source of claim 18 wherein:

applying a catalyst to all surfaces which have contact with said vaporized fuel.

20. The preheat fuel delivery system in combination with a combustion source of claim 18 wherein:

forming a plurality of projections on at least one side of said at least one heater plate.

21. The preheat fuel delivery system in combination with a combustion source of claim 18, further comprising:

a single hole being formed through each corner of each said plate;

a single threaded stud being inserted through each said hole in each said plate; and a nut being tightened on each end of each said threaded stud.

22. A preheat fuel delivery system for a combustion source comprising:

a source of vaporized fuel; and a fuel processor including a first end cap, a second end cap, a center tube, a middle tube, and an outside tube, said middle tube being disposed between said center tube and said outside tube, exhaust gases from an exhaust port of the combustion source entering said center tube through said second end cap, the exhaust gases being routed to an exhaust space between said middle and outside tubes by said first end cap, the exhaust gases exiting said exhaust space through an exhaust outlet port in said second end cap, vaporized fuel entering a fuel space between said center and middle tubes through said first end cap, the vaporized fuel absorbing heat from said center and outside tubes, the vaporized fuel exiting said second end cap into an intake port of the combustion source.

23. The preheat fuel delivery system for a combustion source of claim 22, further comprising:

said first end cap including a cover cap and a path cap, said path cap retaining said tubes, said cover cap being attached to said path cap to seal at least one exposed exhaust passage.

24. A preheat fuel delivery system for a combustion source comprising:

a source of vaporized fuel; and a fuel processor including two end caps, an inner tube, an outer tube, and an insulation layer, said inner tube being disposed in said outer tube, said inner and outer tubes being retained by said two end caps, exhaust gases entering one of said two said end caps, traveling through said inner tube, and exiting through the opposite one of said two end caps, vaporized fuel entering through one of said two end caps, said vaporized fuel traveling through a space between said outer tube said inner tube, said vaporized fuel exiting through the opposite one of said two end caps, said insulation layer being formed around an outer diameter of said outer tube.

* * * * *